(12) United States Patent
Phippen et al.

(10) Patent No.: US 7,493,415 B2
(45) Date of Patent: Feb. 17, 2009

(54) MESSAGE TRANSFORMATION SELECTION TOOL AND METHOD

(75) Inventors: Robert William Phippen, Romsey (GB); John Michael Knapman, Chandlers Ford (GB)

(73) Assignee: International Business Machines Corporation, Armonk, NY (US)

( * ) Notice: Subject to any disclaimer, the term of this patent is extended or adjusted under 35 U.S.C. 154(b) by 939 days.

(21) Appl. No.: 09/764,610

(22) Filed: Jan. 17, 2001

(65) Prior Publication Data

US 2001/0049743 A1    Dec. 6, 2001

(30) Foreign Application Priority Data

May 31, 2000    (GB)    ................................. 0013031.0

(51) Int. Cl.
    *G06F 15/16* (2006.01)
(52) U.S. Cl. ........................................ 709/246; 709/230
(58) Field of Classification Search ............... 707/6, 707/10; 709/237, 246, 230; 715/523
See application file for complete search history.

(56) References Cited

U.S. PATENT DOCUMENTS

| 4,791,558 | A | * | 12/1988 | Chaitin et al. ............... 717/140 |
| 5,339,434 | A | * | 8/1994 | Rusis ......................... 709/246 |
| 5,608,783 | A | * | 3/1997 | Ichnowski et al. ....... 379/88.18 |
| 5,608,874 | A | * | 3/1997 | Ogawa et al. ............... 709/246 |
| 5,627,972 | A | * | 5/1997 | Shear ......................... 709/246 |
| 5,956,688 | A | * | 9/1999 | Kokubo et al. ................ 705/1 |
| 5,999,938 | A | * | 12/1999 | Bliss et al. .................. 707/102 |
| 6,032,147 | A | * | 2/2000 | Williams et al. ............ 707/101 |
| 6,330,617 | B1 | * | 12/2001 | Bamforth et al. ............ 709/246 |
| 6,356,863 | B1 | * | 3/2002 | Sayle .......................... 703/27 |
| 6,493,761 | B1 | * | 12/2002 | Baker et al. ................. 709/230 |
| 6,560,608 | B1 | * | 5/2003 | Tomm et al. ................ 707/102 |
| 6,845,507 | B2 | * | 1/2005 | Kenton ....................... 719/314 |
| 2001/0047311 | A1 | * | 11/2001 | Singh .......................... 705/26 |
| 2003/0041095 | A1 | * | 2/2003 | Konda et al. ................ 709/201 |

FOREIGN PATENT DOCUMENTS

GB          2304944 A     10/2000
WO      WO 98/30962      7/1998

OTHER PUBLICATIONS

IBM MQSeries Integrator product, versions 1 and 2, http://www-4.ibm.com/software/ts/...ies/library/whitepapers/eai-tech, and http://www-4.ibm.com/software/ts/...pers/mqintegrator/msgbrokers.html.

* cited by examiner

*Primary Examiner*—George C Neurauter, Jr.
*Assistant Examiner*—Asghar Bilgrami
(74) *Attorney, Agent, or Firm*—Jerry W. Herndon; Hoffman Warnick LLC

(57) ABSTRACT

A message transformation selection tool and method for use in a distributed message processing system running applications on subsystems using incompatible message formats, selects the most appropriate output message format for a given input message format. Firstly, the tool determines compatibility of each field of the input message format with fields of all possible output message formats. Next, it statistically analyzes the values of message fields in messages stored in message logs for each of the subsystems. On the basis of this analysis, the tool selects the best fit output message into which to transform a given input message.

6 Claims, 3 Drawing Sheets

MESSAGE TRANSFORMATION SELECTION TOOL AND METHOD

FIELD OF THE INVENTION

The present invention relates to the transformation of message formats between components of a distributed data processing system and, in particular, to a tool for selecting message transformations.

BACKGROUND OF THE INVENTION

Distributed data processing systems communicate by the exchange of messages. Various products are known which allow messages to be transmitted between heterogeneous platforms, such as IBM's MQSeries products ("IBM" and "MQSeries" are both trade marks of International Business Machines Corporation). Such transmission is not intelligent in that neither the data content nor the internal format of the messages are transformed so as to be intelligible to applications on the receiving platform. This is because the format of these messages may be inherent to particular nodes of the system or the format may be determined by the specific different applications which are running on the system. In both cases, it is necessary to transform message formats originating from one system component (operating system or application) to formats compatible with other system components. Such transformations have long been known in the art, for example, conversion between different date conventions (DD/MM/YY to MM/DD/YYYY, say).

Although such conversion could be performed by the application programs themselves, in one recent development in the message processing art, so-called message brokers have been developed to route messages intelligently between nodes and to transform the message formats as required.

Two recent message broker products from IBM, MQSeries Integrator Versions 1 and 2, both include a so-called "formatter" which transforms messages from one application format into another. The formatter used in both the IBM products is based on one licensed from New Era of Networks, Inc (NEON) and is described in International Patent Application WO 98/30962 "Method for content based dynamic formatting for interoperation of computing and EDI systems". As one example, these products can transform messages in fixed format, (where each message, and each field within the message, has a specified length in bytes) into standard XML BOD (Business Object Descriptor) messages (XML is the abbreviation for Extended Markup Language).

A general illustration of message transformation is shown in FIG. 1 from which it can be seen that transformation includes both mapping (i.e. relocating) fields in an output message and translation (i.e. expressing values in a different code or convention). An input message 10 originating in a first application consists of four fields 11, named FIELD 1 to FIELD 4. A formatter 12, with access to prestored format definitions and transformation rules for different applications in a database 13, maps FIELDS 1, 2 and 3 to different relative positions in an output message 14, converting them and FIELD 4 as necessary to a different form which will be recognised by a second application. The reformatted output message 14 may then be passed to and processed by the second application.

However, in these systems, the transformations between different types of messages must be predetermined manually and loaded into the transformation engine (formatter and database). This can lead to a very large number of transformations having to be considered as the number of message formats and types of message, even in one system or application, can be very large, particularly if every conceivable transformation must be explicitly recorded. The NEON system reduces this problem somewhat by breaking down messages into basic named canonical (meta-data) components, common to different applications and formats and by using matching of canonical data to determine the appropriate output message conversion. Even this information about transformations at the canonical level, although cutting down the sheer volume of individual transformation pairs to be stored, must still be determined in advance and entered manually. This task is usually performed by a System Administrator using a graphical user interface to enter complete message definitions for different applications and the specific correspondence with format meta-data components into the formatter's database. Typical meta-data could include such terms as "floating point number", "tag" or "delimiter".

SUMMARY OF THE INVENTION

There is thus a need to reduce the burden on the system administrator of defining and manually entering permitted message transformations within the business application architecture.

Accordingly, the present invention provides a message transformation selection tool for use in a distributed message processing system, said system including message transformation means for transforming an input message in any of a plurality of formats recognised by one component of said system into an output message in one of a plurality of different formats recognised by another component of said system and a message log for storing representative samples of messages processed by the respective system components; said selection tool comprising: means for determining compatibility of each field of each of said plurality of input message formats with one or more fields of said plurality of output message formats; means for statistically analysing numerical values of message fields in messages stored in said message log; and selection means responsive to said compatibility determination and said statistical analysis to select the best fit output message field into which to transform a given input message field.

Preferably, the tool is implemented as a computer program.

Although the tool may be provided separately, the invention may also be incorporated within a message broker and the invention comprises message brokers including such a tool.

According to another aspect, the present invention also provides a method of selecting a message transformation in a distributed message processing system, said system including message transformation means for transforming an input message in any of a plurality of formats recognised by one component of said system into an output message in one of a plurality of different formats recognised by another component of said system and a message log for storing representative samples of messages processed by the respective system components; said selection tool comprising: means for determining the compatibility of each field of each of said plurality of input message formats with one or more fields of said plurality of output message formats; means for statistically analysing the values of message fields in messages stored in said message log; and selection means responsive to said compatibility determination and said statistical analysis to select the best fit output message field into which to transform a given input message field.

Preferably, the tool and method of the invention statistically analyse the numerical distribution (i.e. rate of occurrence) of values in the message fields, equivalent to producing a histogram. The values can be anything which may be coded in the fields, such as colours or sizes of goods. Alternatively, they may be prices or other numerical ranges. Selection is on the basis of the best fit distribution for all compatible fields.

The tool may entirely determine the transformation to be used or it may simply rank the output message fields in accordance with the statistical analysis, leaving it to the system administrator to make the final selection.

Compatibility is most easily determined from meta-data, which may be stored for the various fields in a message repository manager which is part of the overall system. This meta-data may include the range of numerical values found in particular fields and may also include the full value distribution statistics for the field.

A basic check for compatibility, based on meta-data, can compare the types of field. Thus, "char", "short", "int" and "long" are all potentially compatible field types, "float" and "double" are compatible types, "char[32]", "char[256]" and "string" are also examples of compatible character types.

Additionally, a looser compatibility selection could be made on the basis of field names being identical, synonymous or otherwise lexically similar.

BRIEF DESCRIPTION OF THE DRAWINGS

The invention will now be described by way of example only, with reference to a preferred embodiment thereof, as illustrated in the accompanying drawings, in which.

DETAILED DESCRIPTION OF THE PREFERRED EMBODIMENT

Figure 1:
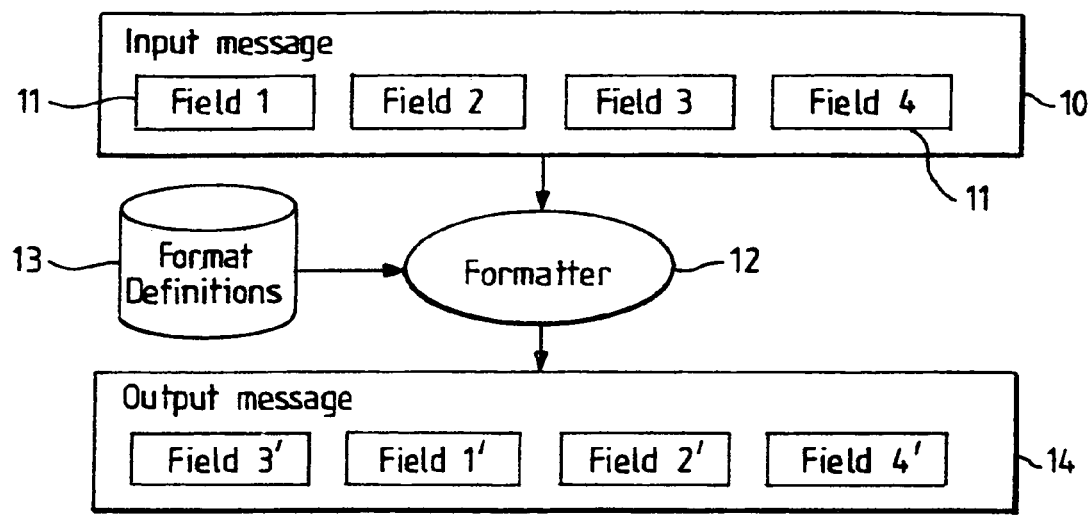
FIG. 1 illustrates the operation of a known formatter with which the present invention may be used.
Figure 2:
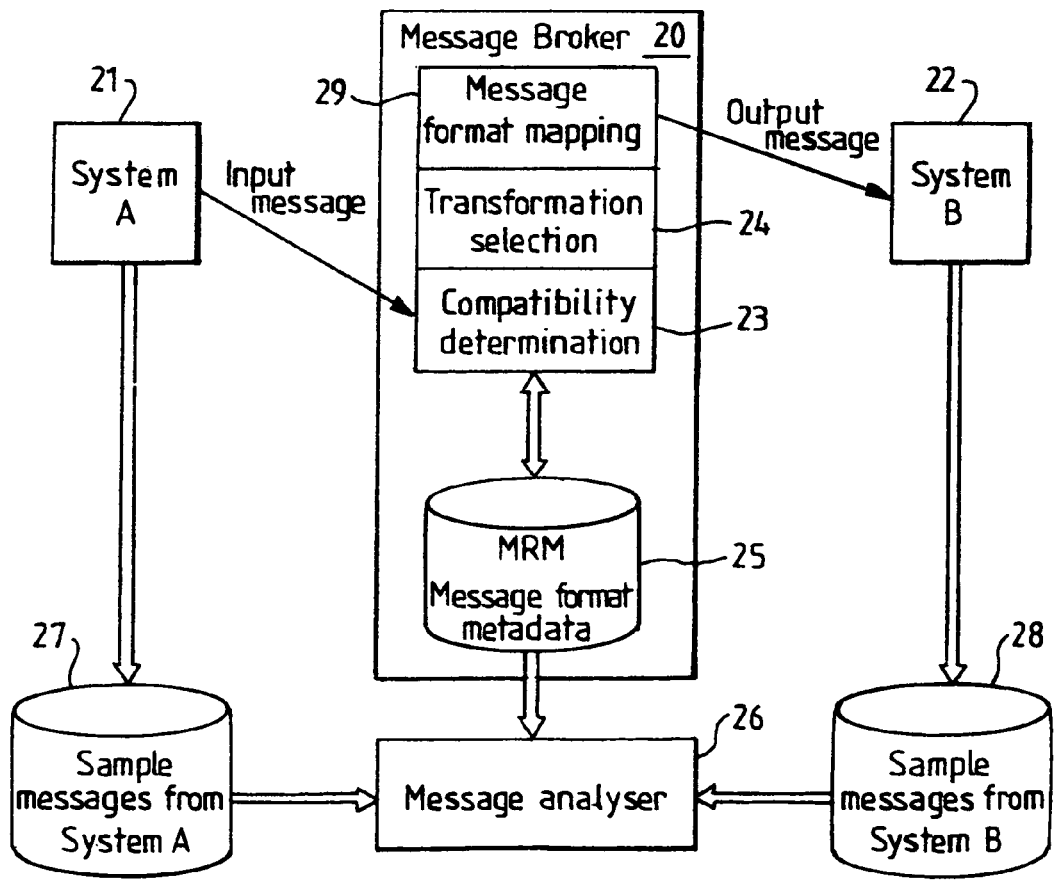
FIG. 2 is a block diagram of a message transformation selection tool according to the present invention and of a message broker system with which the tool is designed to work.

In FIG. 2, a message broker 20, which may be IBM's MQSeries Integrator, Version 2, is employed by an enterprise to integrate two systems A and B, shown at 21 and 22, from different suppliers in order to be able to run applications which together perform a business transaction such as an order entry or an update of customer details.

Taking a concrete example, let us say that we wish to integrate an application running under the IBM CICS transaction processing environment, written in Cobol running on System A, with one from another ERP (Enterprise Resource Planning) system supplier, running on System B ('CICS' is a trademark of International Business Machines Corporation.) The Cobol application sends a message in a proprietary (fixed) format whereas the other supplier uses the self-defining XML (Extended Markup Language) message format, to represent a business transaction as a Business Object Descriptor (BOD), which is a standard of the Open Applications Group (openapplications.org) and which builds on XML.

Part of the task of the enterprise's system administrator is to define message transformations which map between the message formats used on one system and those used in the other system.

This person has to:
1. Decide which COBOL applications need to communicate with which business application on the other ERP system;
2. Decide which set of fixed format messages to use to send the information out of the Cobol application;
3. Decide which BODs to send to the other ERP system;
4. Decide on the detailed reformatting from the data fields held in the Cobol, fixed format message to fields in the BOD, and implement this reformatting by specialising a message broker processing node.

The invention assists the administrator in making the decision about which fields match each other in step 4 and thus acts as a productivity tool.

Returning to FIG. 2, type metadata (eg 'string', 'int', 'float') etc is available for each field in the message to be mapped and is stored in a message repository manager 25, which is part of the broker. This metadata is augmented by a message analyser 26 which statistically analyses the contents of logs 27 and 28 which contain representative samples of messages in systems A and B respectively. Such logs are routinely kept in messaging systems.

Figure 3:
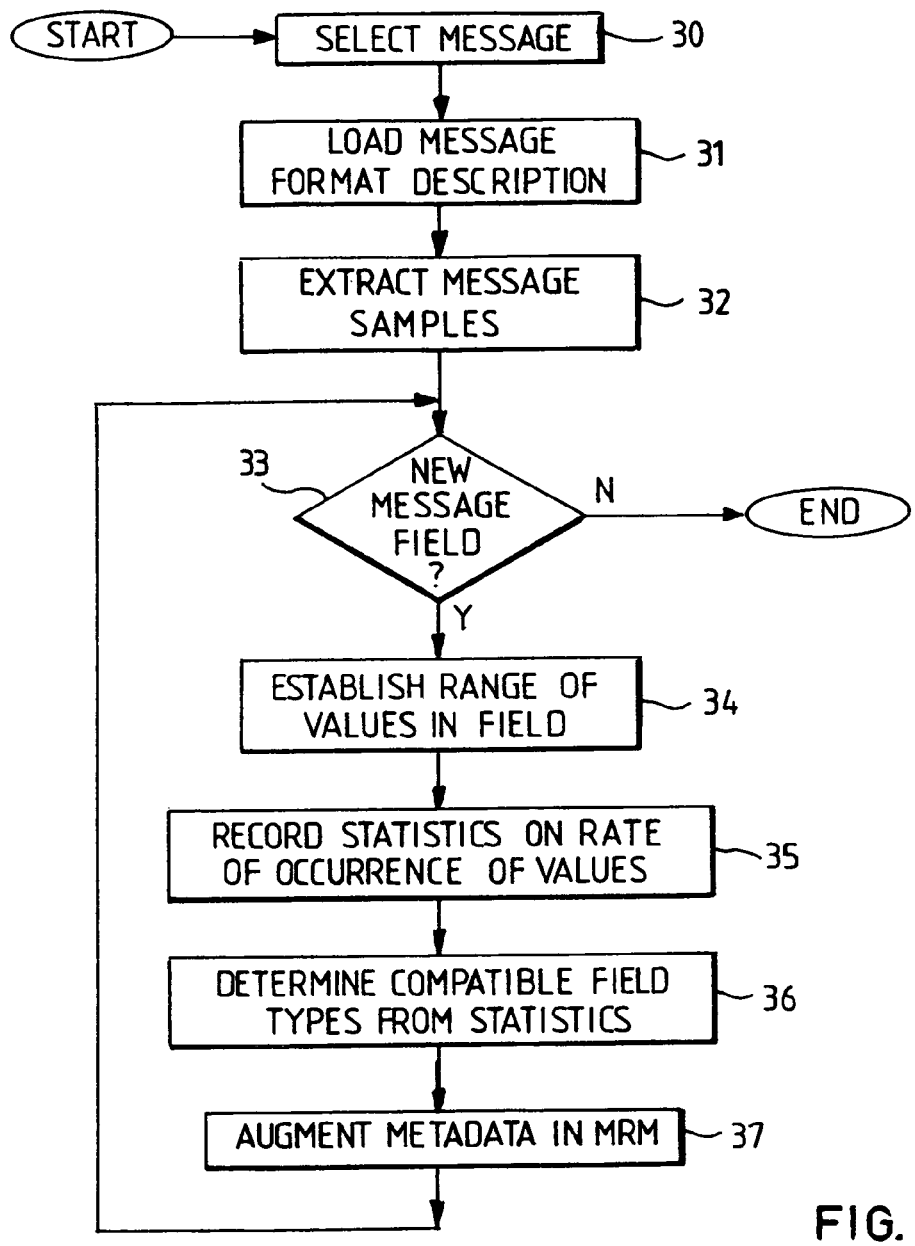
FIG. 3 is a flow diagram illustrating the operation of a message analyser forming part of the selection tool of FIG. 2.

The operation of the Message analyser 26 is as follows, as further illustrated in the flow diagram of FIG. 3

For each message format selected in step 30:
    Load message format description (step 31);
    Open the appropriate 'message warehouse' logs 27 or 28, which contain a representative sample of messages (step 32) in the respective system.

Figure 4:
FIG. 4 shows a typical histogram of the rate of occurrence of possible values in a message field.

For each field (step 33):
    Discover the range of values in the field (step 34). For numbers this will be a numeric range. For strings this may simply catalogue the different strings which occur. If a string field is known to contain 'strings which represent numeric values' like "21", then a conversion can be done on those values;
    Record statistics about the rate of occurrence of the each value in the field (step 35) to produce data equivalent to the histogram shown in FIG. 4;
    Using the statistics, decide what other field types the data in this field is compatible with step 36). For example, any number which can be represented as a 'short integer' could also be represented by an 'integer' or a 'long integer' (but the reverse is not true).
    Augment the message meta-data in the message repository manager 25 for that field with the respective statistics and information about compatibility (step 37).

The metadata from MRM 25 is applied, together with an input message from System A, to a semi-automated message reformatter consisting of compatibility determination means 23, transformation selection means 24 and a conventional message format mapping component 29, which supplies the appropriate output message field. Although shown as part of the message broker 20, the compatibility determination means 23, transformation selection means 24 and message analyser 26 could be a tool, separate from the main message broker for assisting a manual selection by the system administrator.

Figure 5:
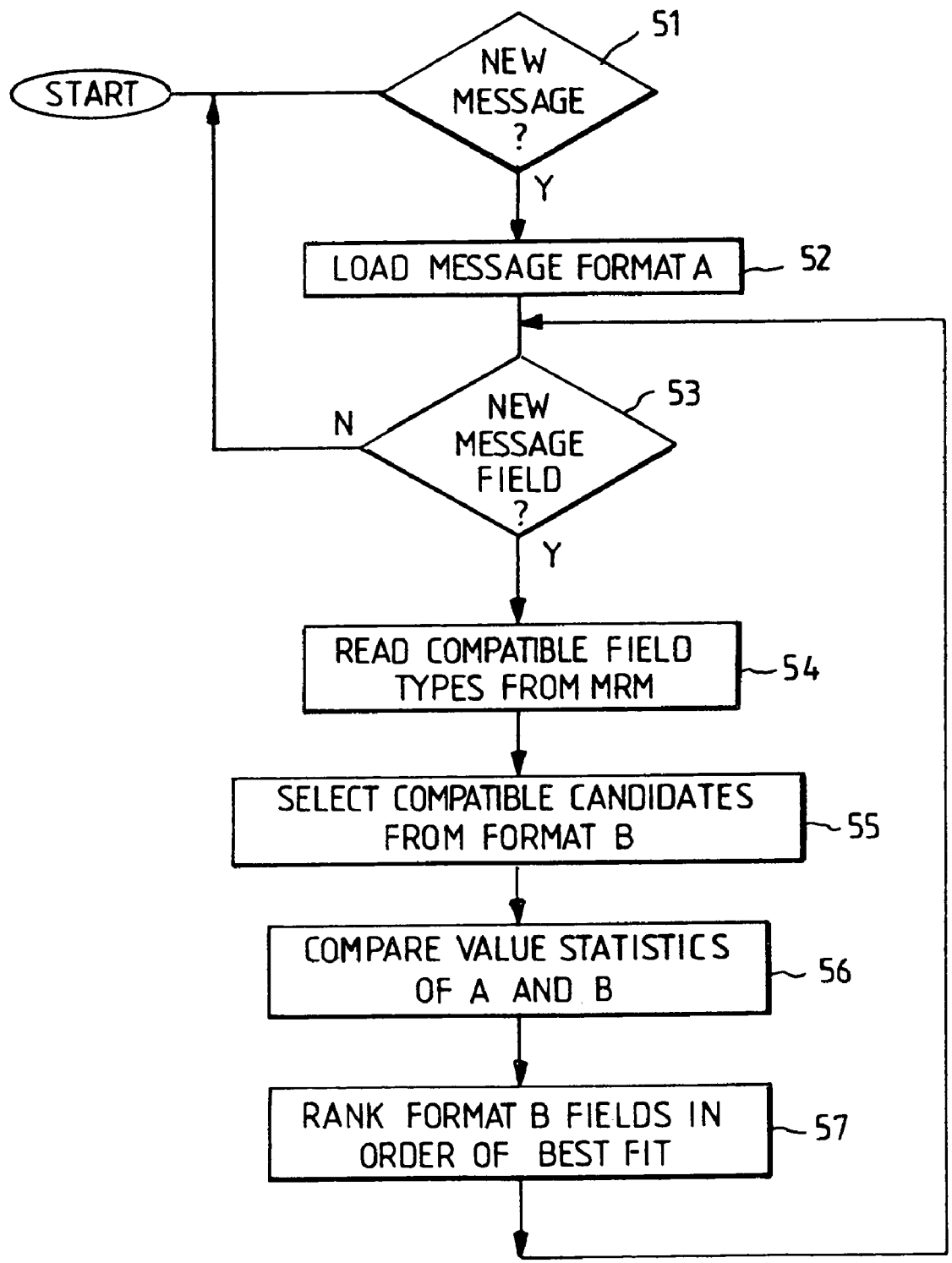
FIG. 5 is a flow diagram illustrating the operation of a semi-automated messager reformatter for selecting the best fit output message field for a given input message field, according to the present invention.

The operation of the reformatter is described in the flow diagram of FIG. 5.

In response to receipt of an input message from system 21 (step 51), a message format description for Message Format A is loaded (step 52);

Message format descriptions for messages recognisable by system 22 (Message Format B) are effectively read from the Message Repository Manager 25 (step 54);

For each field Fa from Message Format A (step 53):

For each field Fb in Message Format B:
  if the type of Fa is compatible with the type of Fb (step 55), then perform a 'value comparison' (step 56). This compares the statistics recorded for the values in Fa for the values in Fb, and assigns a numerical score for compatibility;

Rank the fields in Message Format B with respect to Fa using the numerical score (step 57); in most cases only one field will have a high score; all the others will have a score close to zero: in that case the highest ranked Fa can safely be mapped to Fb.

There are a variety of ways of measuring the similarity of two sets of data values; they are usually based on the idea of comparing the statistical distributions of values in each of the datasets.

For example, if we characterise the statistics of the logs for:
Field a in Log 1 as the histogram $Ha1(x)$;
Field b in Log 2 as the histogram $Hb2(x)$;
where $Hmn(x)$ is just the count of occurrences of x in field m of Log n,
then there are many ways of creating a similarity measure $sim(Ha1, Hb2)$.

One known approach would be to use Bayes theorem to define the $sim(Ha1, Hb2)$ as the probability that Ha1 and Hb2 both come from the same source distribution.

In summary, in the example of the invention described with reference to the drawings, compatible fields are first selected. Then a similarity measure for each pair of fields is derived, based on the statistical analysis of the contents of the two logs. For each field in the input message log, the output message fields are then ranked in order of decreasing similarity. Finally, the transformation is either automatically made to the most similar field or the administrator is allowed to select from the most promising candidates.

The invention claimed is:

1. A method of selecting a message transformation in a distributed message processing system, said system including message transformation means for transforming an input message in any of a plurality of formats recognised by one component of said system into an output message in one of a plurality of different formats recognised by another component of said system and a message log for storing representative samples of messages processed by the respective system components; said selection tool comprising:

means for determining the compatibility of each field of each of said plurality of input message formats with one or more fields of said plurality of output message formats by comparing at least one of a name of each field of said plurality of input message formats with names of fields in the representative samples of messages and a type of each field of said plurality of input message formats with types of fields in the representative samples of messages;

means for analysing the message fields in the representative samples of messages stored in said message log to get a statistical analysis of the values of the message fields by examining values of data in the message fields of the representative samples of messages in an input message format and values of data in the message fields of the representative samples of messages for the plurality of output message formats; and selection means responsive to said compatibility determination and said statistical analysis to select the best fit output message field into which to transform a given input message field.

2. A method as claimed in claim 1 in which said statistical analysis step produces the numerical distribution of values in said message fields and said selection step selects the best fit distribution for all said compatible fields.

3. A method claimed in claim 1 in which said selection step includes ranking output message fields according to the results of the statistical analysis.

4. A method as claimed in claim 1 in which said system further includes a message repository manager for storing meta-data for said two pluralities of message formats, said compatibility determining step comprising determining compatibility from said meta-data.

5. A method as claimed in claim 4 in which the values of said message fields include numerical values and said statistical analysis step includes the steps of analysing the range of numerical values in the respective fields and augmenting said meta-data with said range of values.

6. A method as claimed in claim 4 in which said statistical analysis step produces the numerical distribution of values in said message fields and said selection step selects the best fit distribution for all said compatible fields and in which said meta-data for each field includes said distribution of numerical values for said field.

* * * * *